US008325797B2

(12) United States Patent
Chen et al.

(10) Patent No.: US 8,325,797 B2
(45) Date of Patent: Dec. 4, 2012

(54) SYSTEM AND METHOD OF REDUCED-TEMPORAL-RESOLUTION UPDATE FOR VIDEO CODING AND QUALITY CONTROL

(75) Inventors: Lulin Chen, Cupertino, CA (US); Jiangtao Wen, La Jolla, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 1505 days.

(21) Appl. No.: 11/104,255

(22) Filed: Apr. 11, 2005

(65) Prior Publication Data

US 2006/0227868 A1 Oct. 12, 2006

(51) Int. Cl.
*H04N 7/12* (2006.01)
(52) U.S. Cl. .................................. 375/240.03
(58) Field of Classification Search .............. 375/240.03
See application file for complete search history.

(56) References Cited

U.S. PATENT DOCUMENTS

| 6,192,075 | B1 * | 2/2001 | Jeng et al. ............... 375/240 |
| 6,310,915 | B1 * | 10/2001 | Wells et al. ............. 375/240.03 |
| 7,593,462 | B2 * | 9/2009 | Shimada et al. ......... 375/240.03 |
| 7,804,897 | B1 * | 9/2010 | Pun et al. ................ 375/240.04 |
| 2003/0185299 | A1 * | 10/2003 | Takita .................... 375/240.03 |
| 2005/0025249 | A1 * | 2/2005 | Zhao et al. .............. 375/240.24 |
| 2005/0105815 | A1 * | 5/2005 | Zhang et al. .................. 382/251 |
| 2005/0111552 | A1 * | 5/2005 | Sugio et al. ............. 375/240.16 |

* cited by examiner

*Primary Examiner* — Jayanti K. Patel
*Assistant Examiner* — Richard Torrente
(74) *Attorney, Agent, or Firm* — North Weber & Baugh LLP

(57) ABSTRACT

A novel system and method of Reduced-Temporal-Resolution Update (RTRU) and quantizing video transform coefficients is provided for use using hybrid coding standards when receiving a frame from within a group of video frames, where the amplitude of the quantization parameter is defined for the quantization of the frame according to a reduced temporal resolution update process; where the amplitude of the quantization parameter for macroblocks in the frame is defined according to a reduced temporal resolution update process; and where a bitstream is composed for transmission and subsequent decoding by a standard compliant decoder.

20 Claims, 5 Drawing Sheets

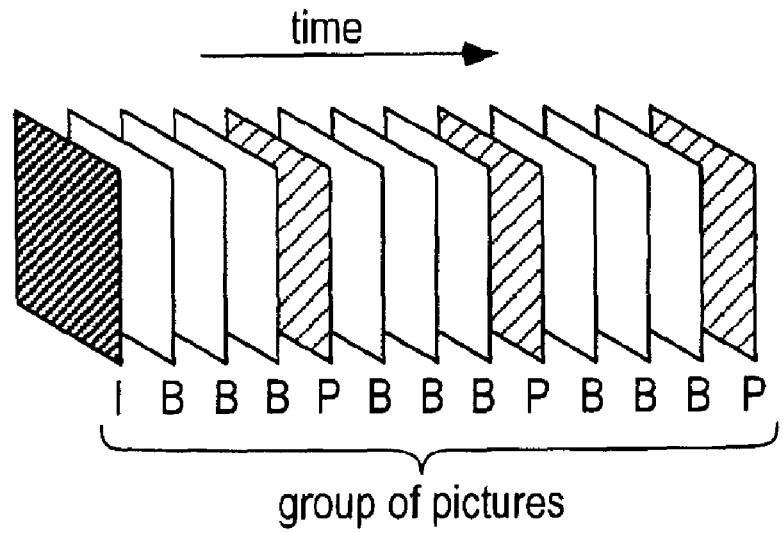
FIG. 1
(conventional)
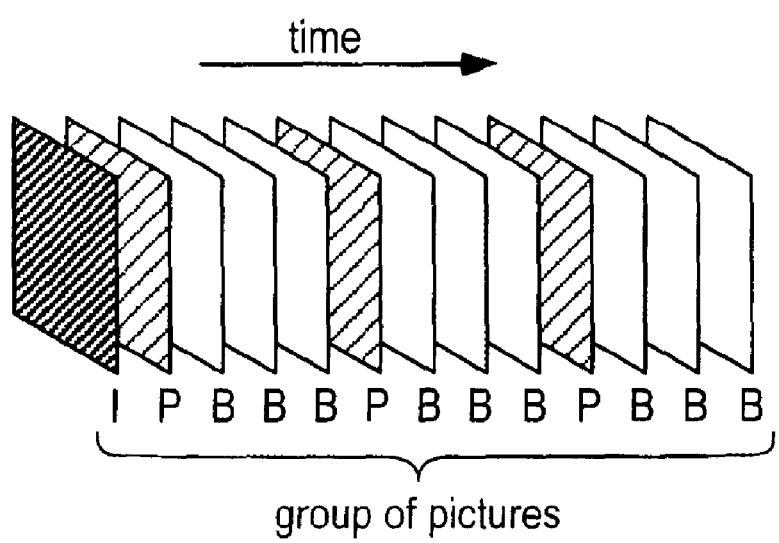
FIG. 2
(conventional)

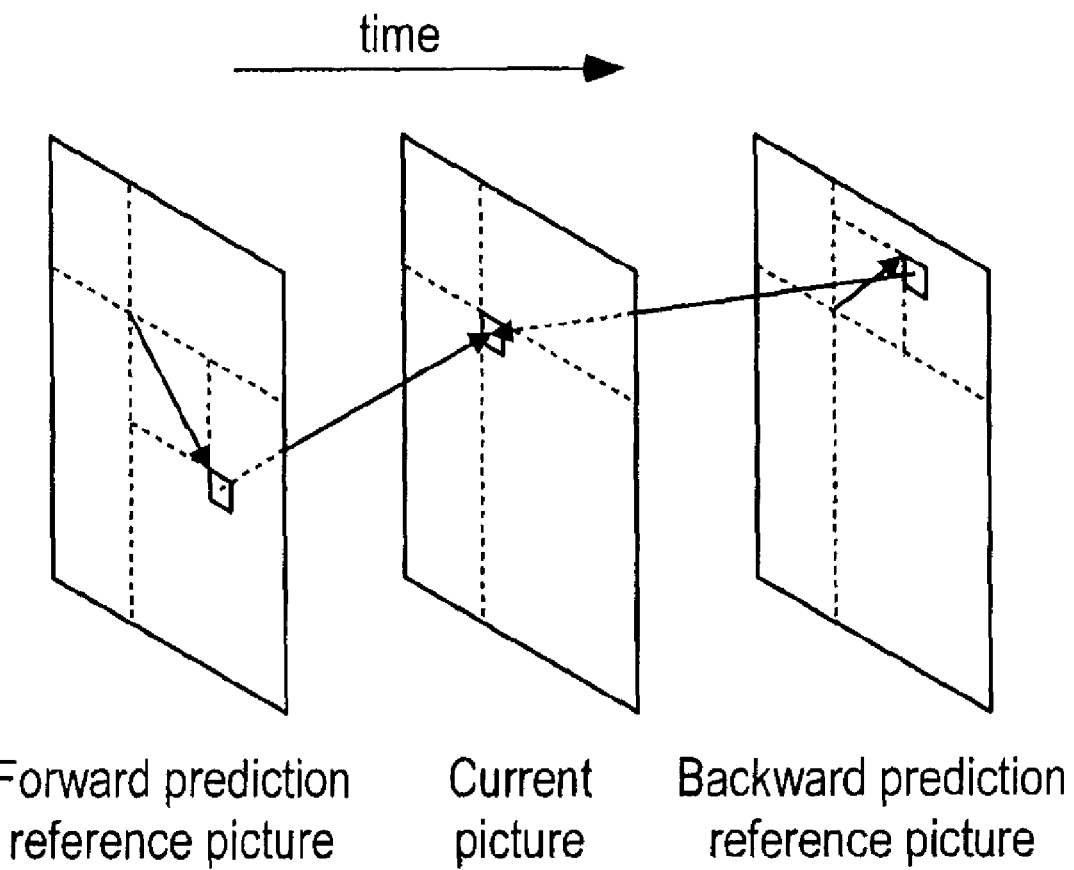
FIG. 3
(conventional)

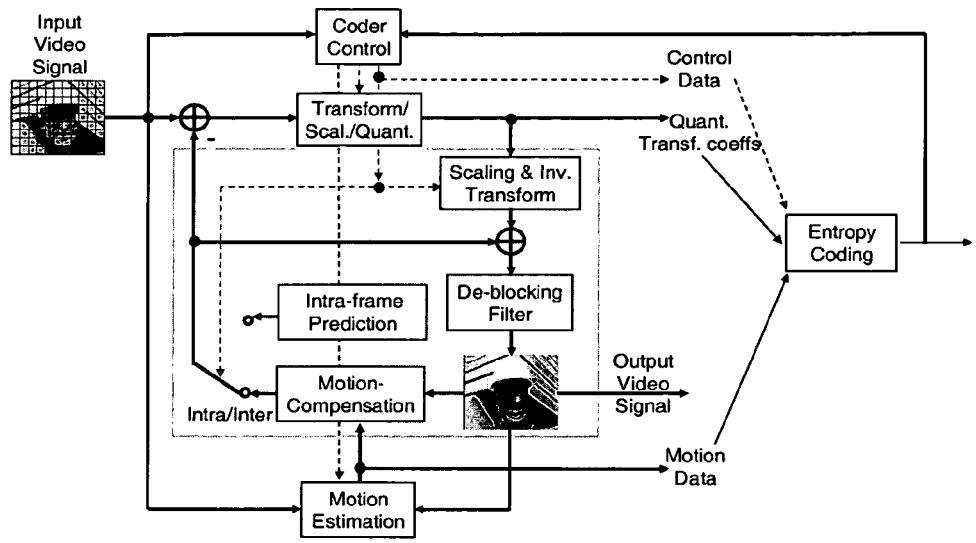
Figure 4 (Prior Art) Basic Encoding Structure
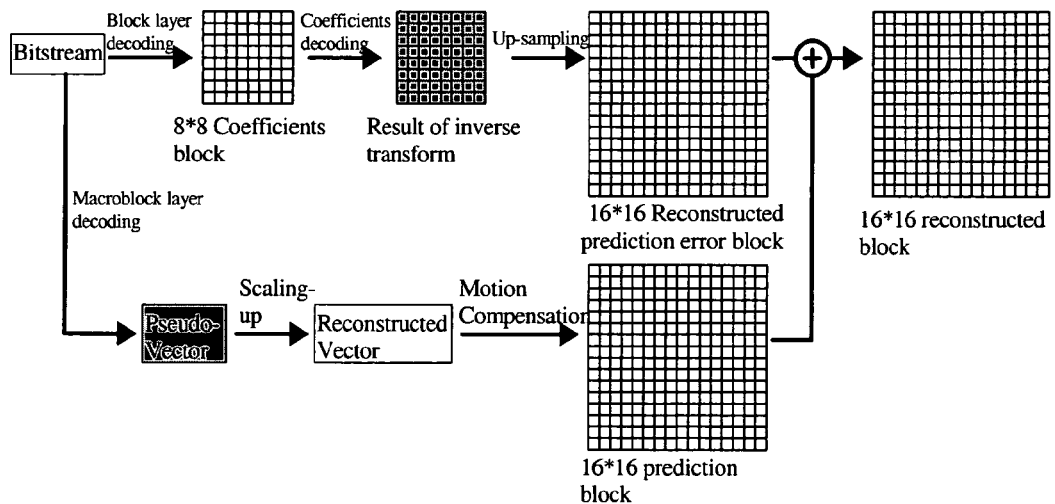
Fig. 5 (Prior Art)

SYSTEM AND METHOD OF REDUCED-TEMPORAL-RESOLUTION UPDATE FOR VIDEO CODING AND QUALITY CONTROL

BACKGROUND

The invention is directed a novel system and method for the optimal quantization of transform coefficients with minimal bit rate overhead by a novel method of reduced temporal resolution update.

The basic essence of a video transmission is a sequence of pictures transmitted at a relatively fixed time sequence for reproduction at a receiving site. For digital transmissions, such sequences of pictures are transmitted in the form of a digital bit stream that is stored at the receiving site and reproduced in some form. In practice, such digitized video transmissions have accompanying audio that together adding up to a large amount of data. The video and audio data can occupy a vast amount of storage space and of transmission bandwidth.

In order to save transmission bandwidth and storage space, video and audio data are compressed at the transmission end, and decompressed at the receiving end. Video compression typically involves taking the differences between adjacent pictures in a stream of pictures or frames and then coding most frames as differences relative to neighboring pictures. This may be done in several ways through the process of motion estimation and compensation by the encoder, and motion compensation at the decoder. An encoder at the beginning of the transmission process is required to determine the way in which a picture is compressed, solely at its own discretion. This is done frequently through code sequences represented by a long decision tree. In contrast, the decoder at the receiving end is configured to merely perform decoding operations according to discrete operational processes performed by the encoder, or "does what it is told to do." To serve as a basis of prediction of other frames and to provide functionalities such as random access to the compressed bitstream, in addition to the first frame, the encoder will occasionally encode input video frames independent of other frames. Such frames are termed "Intra" coded frames. In contrast, other frames that are encoded as the difference between the input and the motion compensated predicted information are termed "Inter" coded frames. Encoder sometimes uses information from "future" frames in a sequence of frames to decode current frames. Thus, the coding order, the order in which compressed frames are transmitted, is not the same as the display order, which is the order in which the frames are presented to a viewer. Frames encoded with reference to both future and past frames are termed "B" (B-directional) frames.

MPEG, such as MPEG-2, MPEG-4 and H.264/AVC, is a standard specifically engineered as a hybrid coding for intra frame/inter-frame (motion) compression of video sequences. FIGS. 1 and 2 illustrate, respectively, a group of pictures in display order in FIG. 1 and in coding order in FIG. 2. In FIGS. 1 and 2 "I" represents intra coded frames, "B" represents bidirectionally predicting coded pictures, and "P" represents forward predicting coded pictures. FIG. 3 illustrates the use of a forward prediction reference pictures and backward prediction reference pictures to generate a current picture. Specifically, FIG. 3 illustrates motion compensation, that is, how future pictures are predicted from subsequent pictures (and future pictures). If motion occurs in a sequence of frames, prediction is carried out by coding differences relative to areas that are shifted with respect to the area being coded. This is known as "motion compensation," and the process of determining the motion vectors is called "motion estimation." The resulting motion vectors, describing the direction and amount of motion of a macroblock, are stored and transmitted to the decoder as part of the compressed bitstream. In operation, the decoder uses the origin and length of the motion vector to reconstruct the frame.

In coding a single frame, the basic building block is the macroblock. Typically, the macroblock is a 16×16 sample array of luminance (gray scale) samples together with one 8×8 block of samples for each of the two chrominance (color) components. Next in the hierarchy is what is known as the "slice," a group of macroblocks in a given scan order. The slice starts at a specific address or position in the picture, and the address (in H.264/AVC the scan pattern is signaled) is specified in a slice header.

Intercoding and intracoding are both built on the Discrete Cosine Transform (hereinafter the "DCT") or DCT like integer transformation, representing the prediction error after motion compensation (in the case of Inter coding) or the input signal itself (in the case of Intra coding, in H.264/AVC spatial prediction before the transform) as a linear combination of spatial frequencies. Each spatial frequency pattern has a corresponding transform coefficient, that is, the amplitude needed to represent the contribution of the specific spatial frequency to the block of data being represented.

DCT coefficients are then quantized by a scalar quantizer via division by a non-zero "quantization step size" and thereafter either truncating the quantized DCT coefficient or rounding the quantized DCT quotient to the nearest integer, termed quantization levels. At the decoder, the inverse operation ("de-quantization") is performed by multiplying the quantization level by the same quantization step size used by the encoder. Both the quantization step size and the quantization levels for each DCT coefficient are signaled in the compressed bitstreams. The reconstruction values, as determined by the above processed, will always be a multiple of the quantization step size of the corresponding coefficient used by the encoder.

It is to be noted that, the larger the quantization value, the lower the precision of the quantized DCT coefficient, and the smaller the quantization level. Physiologically, large quantization values for high spatial frequencies allow the encoder to discard high frequency activity that are of lower perceptibility to the human eye. This saves bandwidth and storage space by discarding data that cannot be detected by the human eye.

FIG. 4 shows basic encoding structure of the existing coding standards such as H.263[1], MEPG-2[2], MPEG-4[3] and H.264/AVC[4]. The De-blocking Filter exists only in H.263 and H.264/AVC. In H.264/AVC, the Intra-frame prediction is performed in pixel domain. The shaded area is equivalent to the decoder.

In low bit rate video applications, frame dropping (FD) is commonly used in video encoding as a compromise between temporally and spatially perceived quality, i.e. it increases the bit budget for individual coded frames therefore produces better quality for the frame at the expense of lowered frame rate after compression, and the resulted unsmooth, "jerky" motion. For some applications, such artifacts are not allowed. For example, MPEG-2 does not allow frame dropping.

Annex Q of the H.263 standard, Reduced-Resolution Update (RRU), shows a method that reduces the bitrate required for temporal and spatial update by reducing the spatial resolution of prediction errors. Then DCT, quantization and entropy coding are all performed on the resolution-reduced prediction errors, thereby, to a large extent, removing a need of dropping frames and meeting the bitrate requirement. In exchange, it will lose some high frequency texture details. FIG. 5 shows the block diagram of the block decoding in the Reduced-Resolution Update mode, Annex Q in H.263. The Pseudo Vector and the Result of the Inverse Transform are the process steps that require scaling processing.

Unfortunately, except for H.263, none of the existing standards including MPEG-2, MPEG-4 and H.264/AVC, supports RRU. Even for H.263 products, RRU can only be employed when both the encoder and the decoder, which are often provided by different manufacturers, support Annex Q. This is not desirable, because many existing decoding products do not support RRU.

Therefore, it is highly desirable to design a coding system that can benefit from the capability of differentiated quantization for transform coefficients and control of preserving high frequency details without the need for special processing by decoders at the receiving destinations. As will be seen, the invention accomplishes this while obviating the need for changing the standard syntax, and further overcomes the shortcomings of the prior art in an elegant manner.

SUMMARY OF INVENTION

The invention is directed to a system and method of quantizing video transform coefficients within well known hybrid coding standards. The method includes defining the amplitude of the quantization parameter for the quantization of frames within a group of pictures (GOP) according to a novel method of reduced temporal resolution update. The method further includes defining the amplitude of the quantization parameter for macroblocks in a frame according to reduced temporal resolution update and macroblock local activity. A bitstream is then composed for transmission and decoding by a decoder that is compliant to the same well known hybrid coding standards. Generally, smaller QPs are used for coding I frames, while larger QPs are used for P/B frames. With larger QPs, prediction errors in P/B frames will be quantized to small values or zeros and therefore less update information, and possibly no update at all, needs to be transmitted. As I frames are coded with smaller QPs and are therefore of high fidelity, the loss in quality as a result of using large QPs for encoding P/B frames is alleviated. The system and method process the quantization parameters solely at the encoding end of the process, and therefore requires no changes to existing video standards or decoders that are compliant with such standards.

THE FIGURES

Various embodiments and exemplifications of our invention are illustrated in the Figures appended hereto.

FIG. 1 shows a "Group of Pictures" in display order as presented to a viewer.

FIG. 2 shows a "Group of Pictures" in transmission order as transmitted to a decoder.

FIG. 3 illustrates how motion vectors are used to construct a frame.

FIG. 4 is a flow diagram illustrating a conventional (prior art) basic encoding structure.

FIG. 5 is a block flow diagram illustrating a conventional (prior art) RRU mode method.

DETAILED DESCRIPTION OF INVENTION

The invention, termed reduced-temporal-resolution update (RTRU), is directed to a system and method for reduced-temporal-resolution update and quality control. The method allows a reduced bit rate for individual coded frames while preserving full spatial and temporal resolution. Moreover, a circuit configured according to the invention requires no changes to existing standards or decoders. According to the invention, in RTRU, temporal-resolution of update is reduced by the overall amplitude of the quantization parameter (QP) for a frame/slice, and quality is further controlled by the local QP adjustment.

In one embodiment, a method of quantizing transform coefficients is provided that defines the amplitude of the quantization parameter for the quantization of a frame. Given a GOP structure, I frame quality mainly defines the overall GOP quality. Encoding I frame with high fidelity compensates to a large extent for any loss of quality as a result of quantizing any prediction errors in P/B frames to zero.

In operation, smaller QPs are used for coding I frames/slices. Larger QPs are used for P/B (Predicted Pictures/bidirectional coded pictures) frames/slices. According to the novel process method, with larger QPs, prediction errors in P/B frames/slices are largely quantized to zero. Thus, no update is required to be transmitted. This inherently reduces the amount of data needed to be transmitted to a destination, thus further reduction of transmitted data using conventional methods, such as frame dumping/dropping (FD), is not necessary.

Again, I frames are coded with smaller QPs and are therefore of high fidelity. The process sets a starting quality for a given group of picture (GOP). Furthermore, on the GOP level, the invention provides that the default QP for the first P frame in a GOP be calculated based on the number of bits spent on the I frame and the GOP bit rate budget. The default QPs for other P/B frames in the same GOP follow some temporal pattern and adjust the further the frame is from the first I frame in the same GOP. Also, to retain local high frequency details, QP can be adjusted on a macroblock-by-macroblock basis. The adjustment is made in terms of content activity in a given macroblock and the neighboring macroblocks such as motion, texture detail and sum of absolute difference (SAD) between the macroblock to be coded and the reference macroblock after motion compensation.

According to the invention, RTRU solves the problem of encoding a video signal with reduced data update from a different perspective and preserves full spatial and temporal resolution. The method uniquely approaches the problem solely on the encoding end of the process, and therefore requires no changes to existing Standards or Standards compliant decoders. The method is applicable to various intra-prediction and inter-prediction based video coding standards and algorithms such as for example H.263, MPEG-2, MPEG-4, and H.264/AVC.

Figure 6:
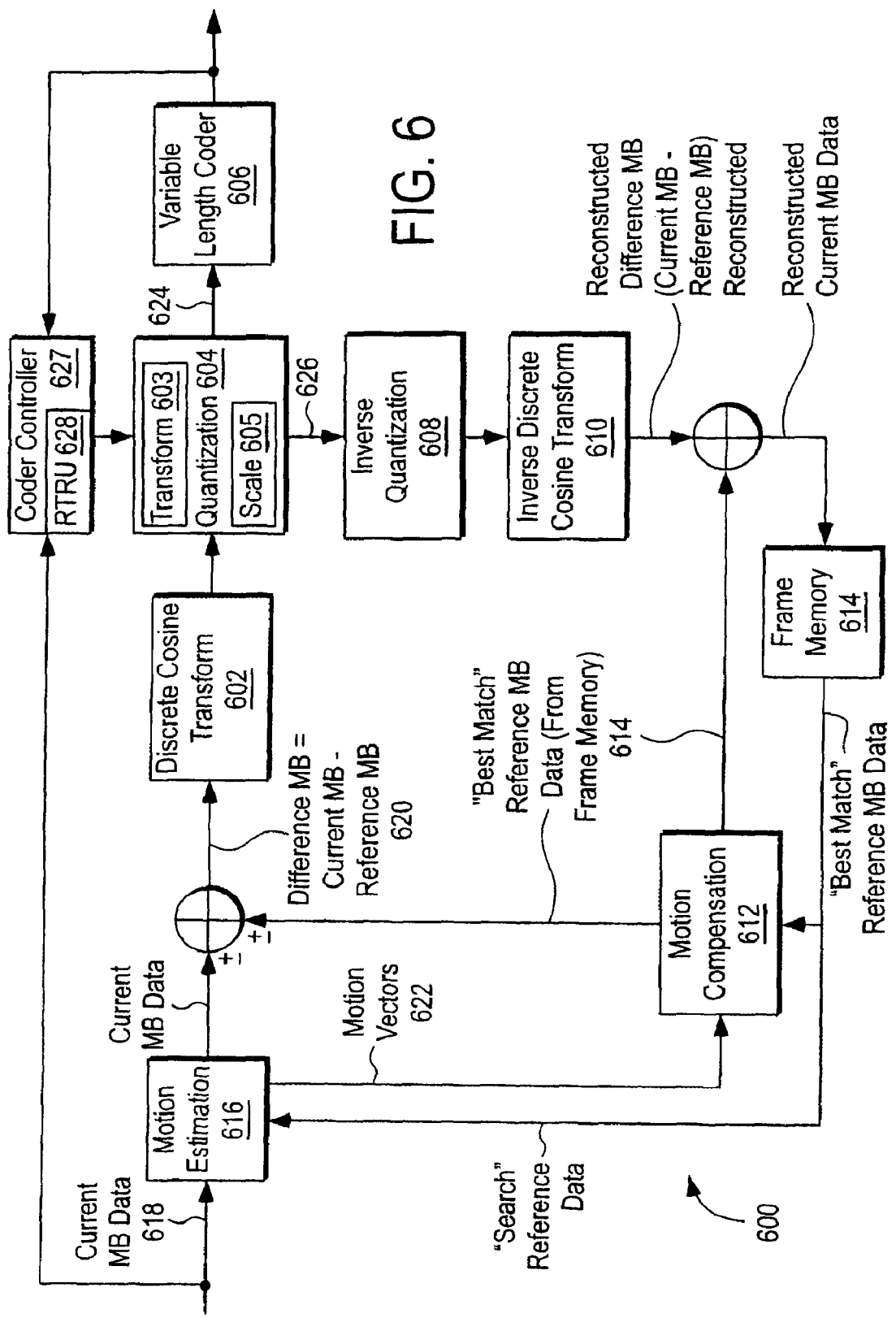
FIG. 6 shows a flow diagram of a generalized MPEG2 compliant encoder including a discrete cosine transformer, a quantizer having a novel RTRU module according to the invention.

Referring to FIG. 6, a flow diagram of a generalized MPEG2 encoder is illustrated including a discrete cosine transformer, a quantizer, a variable length coder, an inverse quantizer, an inverse discrete cosine transformer, motion compensation, frame memory, and motion estimation. The data paths include the $i^{th}$ picture input, difference data, motion vectors the picture output, the feedback picture for motion estimation and compensation, and the motion compensated picture. The system of FIG. 6 incorporates the novel RTRU, and includes an RTRU that is the part of Coder Control. Those skilled in the art will understand that the RTRU may be separate from the coder control as well, and could also possibly be incorporated into another component, but the invention is not intended to be limited to any particular configuration.

RTRU is performed by setting the overall amplitude of the quantization parameter (QP) for frames in a GOP. More particularly, in one embodiment, smaller QPs are used for coding I frames, while larger QPs are used for P/B frames. With larger QPs, prediction errors in P/B frames will be quantized to small values or zeros and therefore no or less update needs to be transmitted. As I frames are coded with smaller QPs and are therefore of high fidelity, the loss in quality as a result of using large QPs for encoding P/B frames is alleviated. There is no inherent need for reducing the frame rate in RTRU.

On the GOP level, the default QP for the first P frame in a GOP is calculated based on the number of bits spent on the I frame and the GOP bit rate budget. The default QPs for other P frames and the B frame in the same GOP are derived from that for the first P frame and they follow some temporal pattern. For example, it decreases by $\Delta(\Delta \geqq 0)$ the further the frame is from the first I frame in the same GOP.

To retain local high frequency details including texture and motion details, usually they are visually important, QP can be adjusted on a macroblock-by-macroblock basis. Typical local QPs adjustment for the current macroblock is based on the macroblock data including, brightness, edge, sum of absolute difference (SAD) and prediction motion vectors (MV). For example, decrease QPs for the macroblocks with larger SADs; decrease QPs for the macroblocks with edges; increase QPs for the macroblocks with larger MV.

Within the RTRU framework, given target bitrate, the I frames can be coded with smaller QPs than those in other methods. Then the P/B frames take advantages of the high fidelity I frames and on the other hand tolerate prediction errors under higher QPs. Yet the local QP adjustment ensures to keep visually important details. Therefore a better coding performance can be obtained than other methods.

The method, system, and program product may be implemented in an MPEG encoder. FIG. 6 shows an architectural flow diagram of a generalized MPEG2 encoder 600, including a discrete cosine transformer 602 and a quantizer, 604. The quantizer includes a transform module 603 and a scalar module 605. The encoder further includes a variable length coder 606, an inverse quantizer 608, an inverse discrete cosine transformer 610, motion compensation 612, frame memory 614, and motion estimation 616. The data paths include the $i^{th}$ picture input 618, difference data 620, motion vectors 622 the picture output 624, and the feedback picture for motion estimation and compensation 626. This Figure has the assumptions that the $i^{th}$ picture exists in Frame Memory or Frame Store 614, and that the $i+1^{th}$ picture is being encoded with motion estimation.

The chart of FIG. 6 is provided for functional illustration of MPEG-2 encoding. In the flow chart, for inter-frame coding with IPPP GOP structure, the images of the $i^{th}$ picture and the $i+1^{th}$ picture are processed to generate macroblock motion vectors (some standards support global motion vectors though). The macroblock motion vectors predict where a macroblock of pixels will be in a prior picture that is close to the current macroblock. For B frame coding, the macroblock motion vectors predict where a macroblock of pixels will be in a prior and/or subsequent picture that is close to the current macroblock. As shown in FIG. 6 the motion vectors, once generated, are used for signaling the motion of the macroblocks of pixels from frame to frame.

As shown in FIG. 6, in the encoding process, the images of the $i^{th}$ picture and the $i+1^{th}$ picture are processed in the encoder 600 to generate motion vectors that are the form in which, for example, the $i+1^{th}$ and subsequent pictures are encoded and transmitted. An input image 618 of a subsequent picture goes to the Motion Estimation unit 616 of the encoder. Motion vectors 622 are formed as the output of the Motion Estimation unit 616. These vectors are used by the Motion Compensation Unit 612 to retrieve macroblock data from previous and/or future pictures, referred to as "reference" data, for output by this unit. One output of the Motion Compensation Unit 612 is negatively summed with the output from the Motion Estimation unit 616 and goes to the input of the Discrete Cosine Transformer 602. The output of the Discrete Cosine Transformer 602 is quantized in a Quantizer 604. The output of the Quantizer 604 is split into two outputs, 624 and 626. One output 624 goes to a downstream element 606 for further compression and processing before transmission, such as to a run length encoder. The other output 626 goes through reconstruction of the encoded macroblock of pixels for storage in Frame Memory 614. In the encoder shown for purposes of illustration, this second output 626 goes through an inverse quantization 608 and an inverse discrete cosine transform 610 to return a lossy version of the difference macroblock. This data is summed with the output of the Motion Compensation unit 612 and returns a lossy version of the original picture to the Frame Memory 614.

According to the invention, the coder controller 627 includes an RTRU module 628 configured to perform the novel method according to the invention. In operation, the RTRU takes the regular result of the coder controller and generates QPs for various types of frames. Moreover, it generates the rule of macroblock QP adjustment, considering the QP change restrictions in different standards accordingly.

The invention may be implemented, for example, by having the quantizer 604 as a software application (as an operating system element), a dedicated processor, or a dedicated processor with dedicated code. The quantizer 604 executes a sequence of machine-readable instructions, which can also be referred to as code. These instructions may reside in various types of signal-bearing media. In this respect, the invention provides a program product comprising a signal-bearing medium or signal-bearing media tangibly embodying a program of machine-readable instructions executable by a digital processing apparatus to perform a novel method for quantizing DCT coefficients.

According to the invention, the coder controller includes a RTRU unit 628 that is configured to select quantization parameters according to a reduced temporal resolution update and quality control process that defines the amplitude of the quantization parameter for the quantization of a frame. In one embodiment, the RTRU unit is configured to define smaller quantization parameters used to code I frames and larger quantization parameters are used to code P/B frames. Prediction errors in P/B frames may then be quantized to zero, obviating the need to transmit updates of such prediction errors to a destination. High fidelity signals are transmitted as a result of using small quantization parameters to code I frames, which compensates for any loss of quality as a result of quantizing any prediction errors in P/B frames to zero. A standard compliant bitstream is then composed that can be decoded by any standard decoder.

Given an application with specified target bit rate, frame size, GOP size, etc., a RTRU process can be performed with the notations as below:

| | |
|---|---|
| M | GOP size |
| N | Number of B frames inserted for the M × N GOP structure |
| m | P Frame position number in the GOP in decoding order, m = 1, 2, . . . M/N − 1. |
| n | B frame position number in decoding order, n = 1, . . . N. |
| I | I frame in the GOP |
| $P_m$ | P frame with position number m |
| $B_{m,n}$ | $n^{th}$ B frame before $P_m$ and after $P_{m-1}$. $P_m$ is replaced by I in next GOP for the last B frames, i.e., m − 1 = M/N − 1. |
| $QP_I$ | QP for the I frame in the GOP |
| $QP_P(m)$ | QP for the P frame at position m in the GOP |
| $QP_B(m, n)$ | QP for $B_{m,n}$ |
| $\delta_x$ | QP adjustment for a macroblock with Rule x, |

Step 1. Select and adjust the QP for I frame in the GOP as in normal encoder. Set $QP_I=QP-\Delta$, $\Delta>0$. In one embodiment, $\Delta$ may be in the range of 2 to 4, inclusive.

Step 2. Calculate QP for the P frames in the GOP. For the first P frame, set $QP_P(1)=QP_I+\Delta_I$, $\Delta_I>0$. In one embodiment $\Delta_I$ may be in the range of 4 to 8, inclusive. $\Delta_I$ is inversely proportional to the bits used for I frame. For other P frames in the GOP, set $QP_P(m)=QP_P(m-1)-\Delta_P$, $\Delta_P\geq 0$. In one embodiment, $\Delta_P$ may be in the range of 0 to 2, inclusive. Go to Step 4.

Step 3. Set QP for the B frames in the GOP. Set $QP_B(m, n)=QP_P(m)+\Delta_B(n),>0$. In one embodiment, $\Delta_B(n)$ may be in the range of 1 to 3, inclusive.

Step 4. Adjust QP for macroblocks within the frame. $QP=QP+\Sigma\delta_x$. For example, $\delta_{SAD}=-6$ if SAD>5000. In one embodiment, $\delta_{SAD}$ may be in the range of −6 to −2; $\delta_{MV}=2$ if MV>16. Note the total QP adjustment should respect the QP change restriction in some standards such as MPEG-4 and H.263.

Step 5. The process proceeds to Step 2 if the next frame is P frame. In, to Step 3 if the next frame is B frame. Then, to Step 1 if the next frame is I frame.

Figure 7:
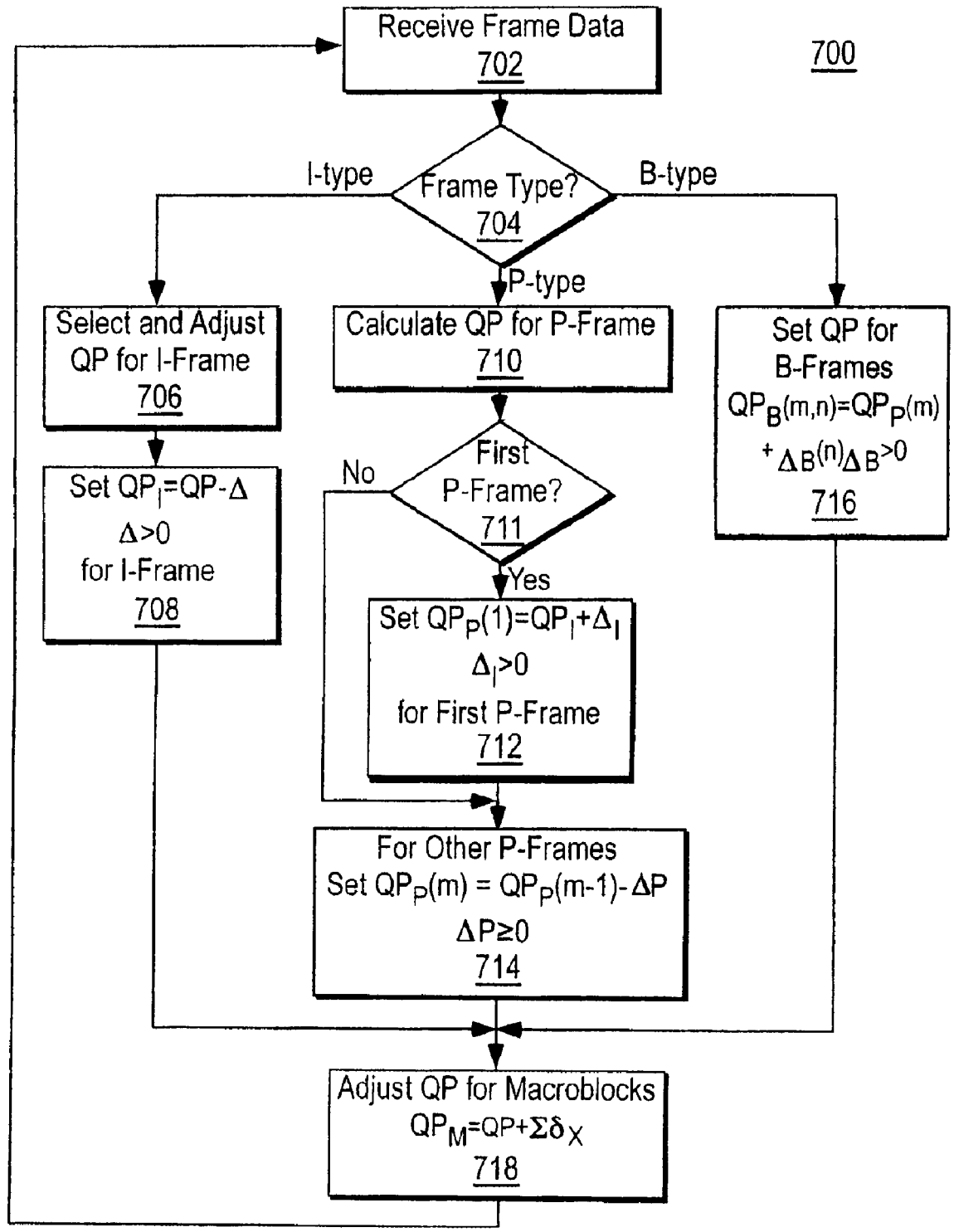
FIG. 7 is a flow chart illustrating a method configured according to the invention.

Referring to FIG. 7, a flow chart illustrating one embodiment 700 of the RTRU process is illustrated. The process begins at step 702, where a frame of data is received. Then, the type of frame (I, P or B) is determined in step 704. If it is an I frame, the process proceeds to step 706, where the QP is selected and adjusted for the I frame. Then, the QP for the I frame is set at $QP_I=QP-\Delta$, $\Delta>0$. If the frame type is a P frame, the process goes from step 704 to 710, where the QP is set for the P frame. The process then determines whether the frame is the first P-Frame in the sequence in step 711. If it is the first P-Frame, then the process proceeds to step 712, where, for the first P frame, QP is set at $QP_P(1)=QP_I+\Delta_I$, $\Delta_I>0$. If it is not the first P-Frame, but is a subsequent frame, QP is set at $QP_P(m)=QP_P(m-1)-\Delta_P$, $\Delta_P>0$. If the frame is determined at step 704 to be a B frame, then the process goes to step 718, where QP is set at $QP_B(m, n)=QP_P(m)+\Delta_B(n),>0$.

The signal-bearing medium may comprise, for example, memory in server. The memory in the server may be non-volatile storage, a data disc, or even memory on a vendor server for downloading to a processor or a quantizer for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++". Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

The invention has been described in the context of a system and method for optimized quantization for video signals utilizing a novel RTRU concept and method. The system and method accomplish optimal quantization of transform coefficients with minimal bit rate overhead. It will be appreciated by those skilled in the art that the invention has a spirit and scope beyond that described herein, and the scope is better defined by the appended claims.

The invention claimed is:

1. A method of Reduced-Temporal-Resolution Update and quantizing video transform coefficients in hybrid coding standards, comprising:
   receiving with a video encoder a frame from within a group of video frames; defining an amplitude of a quantization parameter and a plurality of quantization parameter adjustment values, wherein the plurality of quantization parameter adjustment values is associated with a range of values selected from a plurality of ranges, and each of the plurality of ranges is associated with a distinct frame coding type;
   adjusting the amplitude of the quantization parameter based upon a coding type of the frame from a quantization parameter of a prior frame within the group of video frames using at least one of the plurality of quantization parameter adjustment values;
   defining a macroblock quantization parameter adjustment value and further adjusting the amplitude of the quantization parameter used by said video encoder for macroblocks in the frame based upon said macroblock quantization parameter adjustment value;
   composing a bitstream for transmission and subsequent decoding by a standard compliant decoder; and
   the amplitude of the quantization parameter for a P frame other than a first P frame in said group of video frames is determined by adjusting the amplitude of the quantization parameter for a prior P frame by a value of said plurality of quantization parameter adjustment values.

2. A method according to claim 1, wherein smaller quantization parameters are used to code I frames and larger quantization parameters are used to code P/B frames.

3. A method according to claim 1, wherein the reduced temporal resolution update is performed in a compliant manner to hybrid coding standards including H.263, MPEG-2, MPEG-4, and H.264/AV.

4. A method according to claim 1, wherein default quantization parameters for frame types, including predicted frames and bi-directionally predicted frames, in the same GOP follow a temporal pattern.

5. A method according to claim 4, wherein the default quantization parameter decreases with respect to a distance from an I frame in the GOP for the same types of frames.

6. A method according to claim 1, wherein quantization parameters in a frame are adjusted on a macroblock by macroblock basis.

7. A method according to claim 6, wherein the quantization parameter adjustment for a macroblock is based on the macroblock data corresponding to visual importance.

8. A method according to claim 6, wherein the quantization parameter adjustment for a macroblock is based on the macroblock data corresponding to visual importance, including brightness, SAD value and motion vector size.

9. A method according to claim 6, wherein the quantization parameter adjustment for a macroblock is based on the macroblock data corresponding to brightness.

10. A method according to claim 6, wherein the quantization parameter adjustment for a macroblock is based on the macroblock data corresponding to SAD value.

11. A method according to claim 6, wherein the quantization parameter adjustment for a macroblock is based on the macroblock data corresponding to motion vector size.

12. The method according to claim 1, wherein the amplitude of the quantization parameter for an I frame is determined by adjusting a default quantization parameter value by a first value of said plurality of quantization parameter adjustment values.

13. The method according to claim 12, wherein said first value ranges from 2 to 4, inclusive.

14. The method according to claim 12, wherein:
the amplitude of the quantization parameter for the first P frame in said group of video frames is determined by adjusting the amplitude of the quantization parameter for the I frame by a second value of said plurality of quantization parameter adjustment values; and
the amplitude of the quantization parameter for a P frame other than said first P frame in said group of video frames is determined by adjusting the amplitude of the quantization parameter for a prior P frame by a third value of said plurality of quantization parameter adjustment values.

15. The method according to claim 14, wherein the second value is in the range of 4 to 8, inclusive.

16. The method according to claim 14, wherein, for third value is in the range of 0 to 2, inclusive.

17. The method according to claim 14, wherein the amplitude of the quantization parameter for a B frame is determined by adjusting the amplitude of the quantization parameter for a prior P frame by a fourth value of said plurality of quantization parameter adjustment values.

18. The method according to claim 17, wherein, for fourth value is in the range of 1 to 2, inclusive.

19. The method according to claim 1, wherein the macroblock quantization parameter adjustment value is in the range of −6 to 2, inclusive.

20. The method according to claim 1, wherein adjustment of the amplitude of the quantization parameter comprises either incrementing or decrementing the amplitude of the defined quantization parameter using one of the quantization parameter adjustment values and incrementing the resulting amplitude of the quantization parameter using the macroblock quantization parameter adjustment value.

\* \* \* \* \*